2,213,906

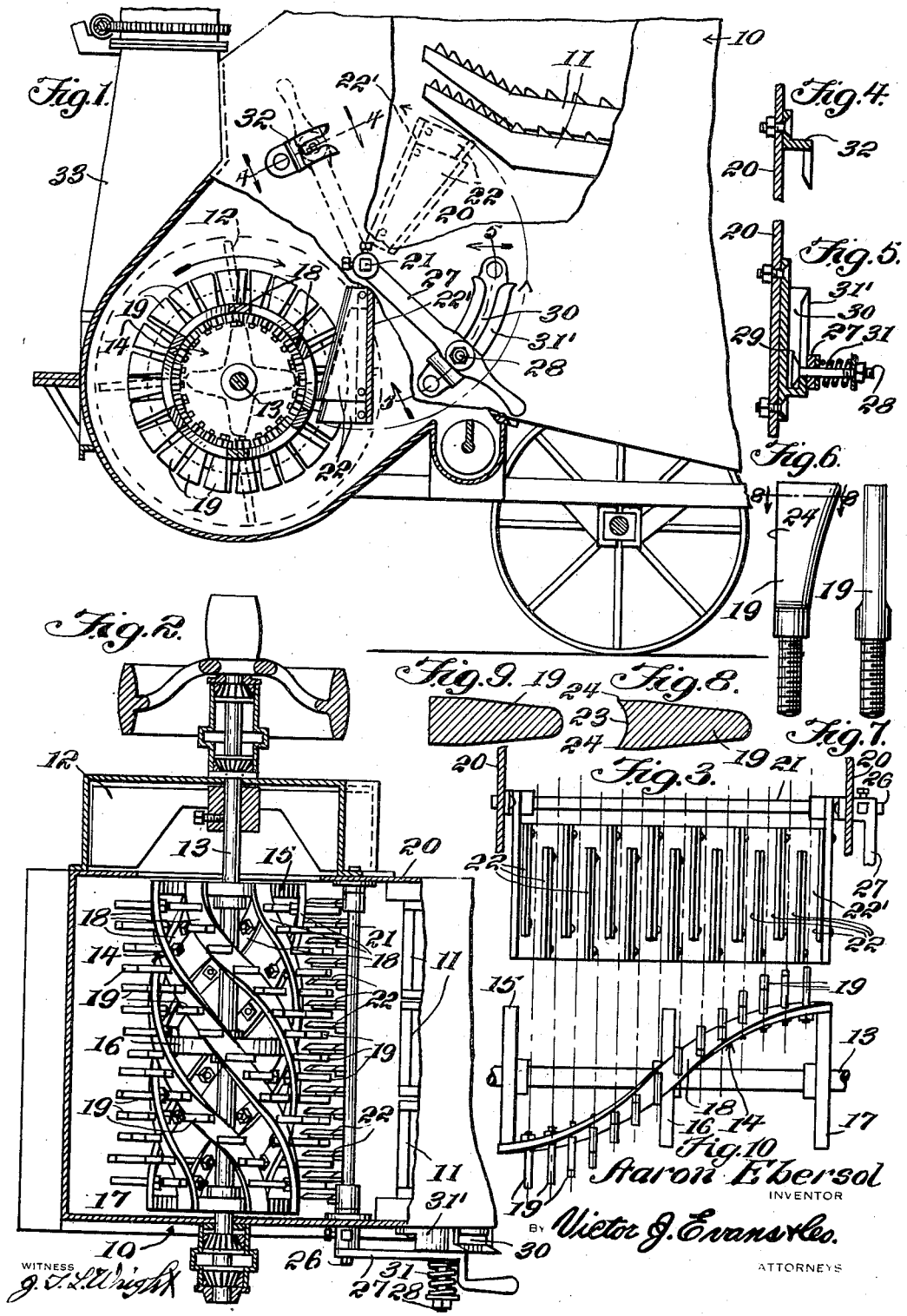
Sept. 3, 1940. A. EBERSOL 2,213,906
STRAW SHREDDER ATTACHMENT FOR THRESHING MACHINES
Filed Jan. 25, 1939
Aaron Ebersol
INVENTOR
BY Victor J. Evans & Co.
ATTORNEYS Patented Sept. 3, 1940

UNITED STATES PATENT OFFICE 2,213,906

STRAW SHREDDER ATTACHMENT FOR THRESHING MACHINES

Aaron Ebersol, Milverton, Ontario, Canada

Application January 25, 1939, Serial No. 252,826

3 Claims. (Cl. 130—27)

My invention relates to improvements in a straw shredder adapted to be incorporated in a threshing machine or other agricultural implements of a similar nature.

An important object of my invention is to provide a straw shredder that will dissect the straw as it comes from the straw rack or risers of the threshers and so on.

Another object of the invention is to incorporate a straw shredder in the mechanism of the thresher so that it will form a part of the same and be operated thereby, and requiring no extra attention apart from general maintenance.

Yet another object of my invention is to provide a straw shredder that may be entirely enclosed within the frame or body of the thresher or other agricultural implements of a similar nature.

Yet another object of my invention is to provide a straw shredder that will operate under comparatively reduced power.

A further object of my invention is to provide a shredder that is simple in construction, efficient in operation and inexpensive to manufacture.

Other objects and advantages of my invention will be apparent during the course of the following description:

In the accompanying drawing, forming a part of this specification, and in which like numerals are used to designate like parts throughout the same, Figure 1 is a side elevation of a device embodying my invention, and showing its association with a threshing machine, Figure 2 is a plan view of the same showing parts in elevation and parts in section, Figure 3 is a plan view of the stationary cutter arrangement embodying a part of my invention.

Figure 4 is a transverse sectional view taken on line 4—4 of Figure 1,

Figure 5 is a transverse sectional view taken on line 5—5 of Figure 1,

Figure 6 is a side elevation of the rotating cutting knives, teeth or projections, Figure 7 is an end elevation of the same, Figure 8 is a transverse sectional view taken on line 8—8 of Figure 6, showing one form of knife, teeth or projections embodied by my invention, Figure 9 is a view similar to Figure 8, showing another form of knife, teeth or projections, and Figure 10 is a plan view of the rotary cutter arrangement embodying a part of my invention.

In the drawing, wherein for the purpose of illustration, is shown a preferred embodiment of my invention, the numeral 10 designates the rear portion of a threshing machine having the conventional straw rack and risers 11, and fan member 12. My device is adapted to receive the straw from the risers 11 before it enters the fan 12 and is mounted on an extension of the shaft 13 carrying the fan 12 or other suitable shaft and rotated by the thresher or other power. The rotary member 14 comprises spaced circular heads 15, 16 and 17 formed on the shaft 13 and mounted laterally and spirally or other suitable way, on the said heads are the bars 18 detachably secured thereto. The spiral bars 18 or other members are provided with a plurality of projections or teeth 19 spaced thereon and projecting vertically therefrom and radially of the shaft 13, as illustrated in Figure 3. The projections or teeth 19 are preferably formed with a concave cutting face 23, providing cutting edges 24 at its either longitudinal edge so that when the teeth 19 or projections pass between adjacent pairs of knives the cutting edges 24 thereof will cooperate with the knives to effectively chop the stalks of straw or whatever it may be. The teeth 19 may be formed with a flat cutting face or other cutting face if desired, as illustrated in Figure 9.

Extending through the housing 20, parallel with and in close proximity to the rotary structure is a shaft 21 which carries thereon a plurality of spaced knives 22 which are arranged in rows and adjustably mounted on a radially disposed supporting member 22'. The knives are detachably bolted on the supporting member 22' so that the said knives may be easily removed to sharpen the same. The knives 22 are spaced so that the teeth 19 will pass between but not in contact with adjacent pairs thereof, as illustrated in Figure 2.

The end 26 of the shaft 21 projects a substantial distance beyond the edge of the housing 20 and a handle 27 is carried thereby exteriorly of the housing and in acute angular relation with the knives 22. The handle is provided adjacent its outer end with a bolt 28 having a head 29 spaced from the inner side of the handle and adapted to engage the slot 30 of a clip 31' fastened to the outer surface of the housing 20. A spring 31 is carried by the bolt 28 exteriorly of the handle and the resilient action thereof is sufficient to maintain the head 29 of the bolt in close frictional engagement with the clip 31'. A second clip 32 is fastened to the housing a substantial distance from the clip 31' and equidistant from the shaft 21. The clip 32 permits the handle 27, shaft 21 and knives 22 to be rotated out of engagement with the rotary member 14 and to be maintained in this position by the engagement therewith of the head of the bolt 28, and held therein under tension by the spring 31.

The operation of my device is as follows:

The rotary structure 14, rotatably mounted on a shaft 13 or other suitable shaft, receives the straw from the straw rack 11. The straw is engaged by the teeth 19 or projections, projecting vertically from the spiral or other desired shaped bars 18 and rotated into the cutting edges of the knives 22 where it is finely dissected. The spiral formation of the members 18 will cause the straw to be augered into the rotating fan 12 and discharged through the blower 33. In the event that any unyielding object should strike the knives, then the spring 31 carried by the handle 27 and holding the same in engagement with the clip 31 will permit the knives 22 to fly away from the rotary structure and save any severe damage to knives and shredder projections or teeth, therefore it is called a safety device.

These knives can be adjusted to and from rotary structure 14 according to desired fineness of straw.

If no shredding is desired, then knives 22 are elevated so that the head of the bolt 28 engages with the clip 32 illustrated by dotted lines in Figure 1. The knives are then positioned away from the teeth 19, permitting free access for long straw threshing.

It is to be understood that the form of my invention herewith shown and described is to be taken as a preferred example of the same and that various changes in the size, shape and arrangement of parts may be resorted to without departing from the spirit of my invention or the scope of the appended claims.

Having thus described my invention, I claim:

1. In combination with a threshing machine having a straw rack and a fan, a straw shredder comprising a rotary member interposed between the straw rack and the fan and actuated by the mechanism of the said threshing machine, a shaft spaced from and parallel to the said rotary member, a plurality of aligned knives extending radially from said shaft and arranged to cooperate with the said rotor to shred the straw, a handle carried by the said shaft exteriorly of the housing of the said thresher, a keeper to receive said handle, and yieldable means carried by said handle and coacting with said keeper to hold the handle normally in an operative position but permitting the release of the same if an unyielding object should strike the said knives.

2. In a threshing machine having a straw rack, a fan, and a cutter rotatable with the fan and adapted to convey the shredded straw into the fan; a shaft rotatably mounted parallel to and in close proximity with the rotary cutter, a plurality of spaced radially disposed knives carried by the shaft and adapted to coact with the rotary cutter in shredding the straw, a handle member carried by the shaft, and catch means to normally hold the knives operatively associated with the cutter but adapted to release the handle and to permit rotation of the shaft and knives in a direction away from the cutter if an unyielding object should strike the knives.

3. In a threshing machine having a straw rack, a fan, and a cutter rotatable with the fan and adapted to convey the shredded straw into the fan; a shaft rotatably mounted parallel to and in close proximity with the rotary cutter, a plurality of spaced radially disposed knives carried by the shaft and adapted to coact with the rotary cutter in shredding the straw, a handle member carried by the shaft, a spring influenced catch carried by the handle, and a keeper receiving the catch in a manner to normally hold the knives operatively associated with the cutter but adapted to release the handle and to permit rotation of the shaft and knives in a direction away from the cutter if an unyielding object should strike the knives.

AARON EBERSOL.